United States Patent [19]

Ekstam

[11] Patent Number: 5,355,860
[45] Date of Patent: Oct. 18, 1994

[54] FUEL DELIVERY SYSTEM FOR DIESEL ENGINES

[76] Inventor: Charles L. Ekstam, 318 S. Oak St., California, Mo. 65018

[21] Appl. No.: 911,119

[22] Filed: Jul. 9, 1992

[51] Int. Cl.⁵ .......................................... F02M 37/04
[52] U.S. Cl. ..................................... 123/516; 123/510
[58] Field of Search ............... 123/516, 514, 456, 510, 123/512

[56] References Cited

U.S. PATENT DOCUMENTS

| | | | |
|---|---|---|---|
| 1,269,787 | 6/1918 | Church | 123/516 |
| 2,222,274 | 11/1940 | Antonsen | 123/516 |
| 4,372,847 | 2/1983 | Lewis | 123/510 |
| 4,411,239 | 10/1983 | Kelch | 123/516 |
| 4,454,848 | 6/1984 | Duprez | 123/516 |
| 4,539,965 | 9/1985 | Soltau | 123/514 |
| 4,543,938 | 10/1985 | Szlaga | 123/516 |
| 4,763,684 | 8/1988 | Kelch | 123/516 |
| 4,933,093 | 6/1990 | Keller | 123/512 |
| 4,979,482 | 12/1990 | Bartlett | 123/510 |
| 5,095,880 | 3/1992 | Ricks | 123/516 |

FOREIGN PATENT DOCUMENTS

| | | | |
|---|---|---|---|
| 0210355 | 12/1983 | Japan | 123/516 |
| 1216653 | 12/1970 | United Kingdom | 123/516 |

OTHER PUBLICATIONS

Cummins, Service Topics Dated Jul. 1, 1965, 9 pages.

*Primary Examiner*—Carl S. Miller
*Attorney, Agent, or Firm*—Hovey, Williams, Timmons & Collins

[57] ABSTRACT

A fuel delivery system for removing air from fuel delivered to an engine, and particularly a diesel engine, includes an engine, a primary water separation filter, and a secondary air separation filter. The air separation filter is located downstream from the water separation filter for delivering substantially gas-free fuel to the engine. The air separation filter includes a vessel, a fuel inlet into the vessel, a fuel outlet leading to the engine, a fuel return discharge leading to the fuel tank, and a filter cartridge including filter media presenting numerous small openings therein for permitting the passage of fuel therethrough but screening out bubbles entrapped in the fuel. As the bubbles are trapped on the screen, they float upward to the fuel level and then spill over the upper margin of an upright tube within the vessel leading to the fuel return discharge and then to the fuel tank so that only substantially gas-free fuel is delivered to the engine.

16 Claims, 3 Drawing Sheets

FUEL DELIVERY SYSTEM FOR DIESEL ENGINES

BACKGROUND OF THE INVENTION

1. Field of the Invention

A novel fuel delivery system for removing entrained air from a source of fuel is provided. The system advantageously includes not only a water separator, but also a separation chamber including filter media for removing air from the fuel.

2. Description of the Prior Art

Internal combustion engines are designed and configured to operate on fuel of a standard quality, and the introduction of impurities into the fuel may impair or prevent operation of the engine. For example, it is well known that even a small quantity of water in diesel fuel may prevent operation of a diesel engine. As a result, most diesel engines in motor vehicles include, in addition to a filter for removing sediment or other solids in the fuel, a water separator for removing water vapor which has condensed in the fuel line or fuel tank, or was introduced into the fuel tank in a liquid state.

Many diesel engines used in over-the-road trucking consume prodigious amounts of fuel. For example, a six cylinder diesel engine operating at full power may utilize 22 to 25 gallons per hour. Fuel is delivered to the cylinder for combustion with the air in precise amounts by fuel injectors. Since the amount of air in the cylinder in a diesel engine is known (determined by the volume of the cylinder), the fuel/air mixture is normally tightly controlled, often by electronic fuel injection which may even compensate for temperature and other variables in the air supply. Unfortunately, when air has been entrained in the diesel fuel and delivered to the cylinder, it has been found that engine performance suffers. The greater the amount of air in the diesel fuel, the more deleterious the effect. Thus, there has developed a need for a fuel delivery system which can remove entrained air and other gases and vapors from the fuel delivered to the engine.

SUMMARY OF THE INVENTION

The problem as outlined above has largely been solved by the fuel delivery system of the present invention, which includes an air separation chamber for removing air trapped in the fuel. Preferably, a multi-stage filter system is employed for removing particulates, water and air from the fuel before delivery to the cylinder of an internal combustion engine.

In greater detail, the present invention includes a tertiary filter which removes residual air bubbles entrapped and entrained in the fuel which would otherwise be delivered to the fuel injectors and the cylinders of the engine. The fuel is preferably delivered from the fuel tank through a water separation filter and then through a pump to a particulate filter which removes any remaining soil, rust particles or the like. The fuel then passes through a regulator before passing to the air removal filter.

The air removal filter includes a vessel defining an interior which acts as a reservoir for fuel. A separation or filter media is located within the reservoir so as to be submerged within the fuel. The vessel also includes an inlet for receiving fuel into the reservoir, an outlet leading to the fuel injector pump and cylinders of the engine, and an overflow tube which leads to a fuel return line for returning fuel and air bubbles back to the fuel tank.

In particularly preferred forms, the filter media is provided as an elongated tube which is threadably mounted on a housing portion of the vessel, with the lower or canister portion of the filter being threadably mounted to the housing. Thus, when and if the filter media needs to be replaced, the canister can be disconnected and only the filter media need be replaced. The canister is advantageously provided with a fuel drain at the bottom thereof for permitting controlled discharge of the fuel received therewithin. Additionally, an air purge line may connect the outlet with the uppermost portion of the vessel whereby air within the outlet can be purged back to the fuel tank during filling of the reservoir and outlet.

The system also includes a pump for ensuring adequate fuel flow through the filter media, and a regulator for limiting fuel flow according to pressure downstream therefrom to prevent damage to the system.

In operation, the fuel containing trapped or entrained air bubbles enters the reservoir. Some of the bubbles immediately float to the surface where they enter the overflow tube and are carried with the excess fuel through the return line. Other bubbles may be carried with the fuel down to the filter media. However, the filter media presents only very small openings therethrough, allowing the liquid fuel to pass but not the bubbles of air or other gas. As a result, the bubbles are separated from the fuel and float to the surface to be carried through the overflow tube to the return line. The fuel thus delivered to the engine is thus substantially free of air or other undesired gas and performance is improved.

DESCRIPTION OF THE PREFERRED EMBODIMENT

Figure 1:
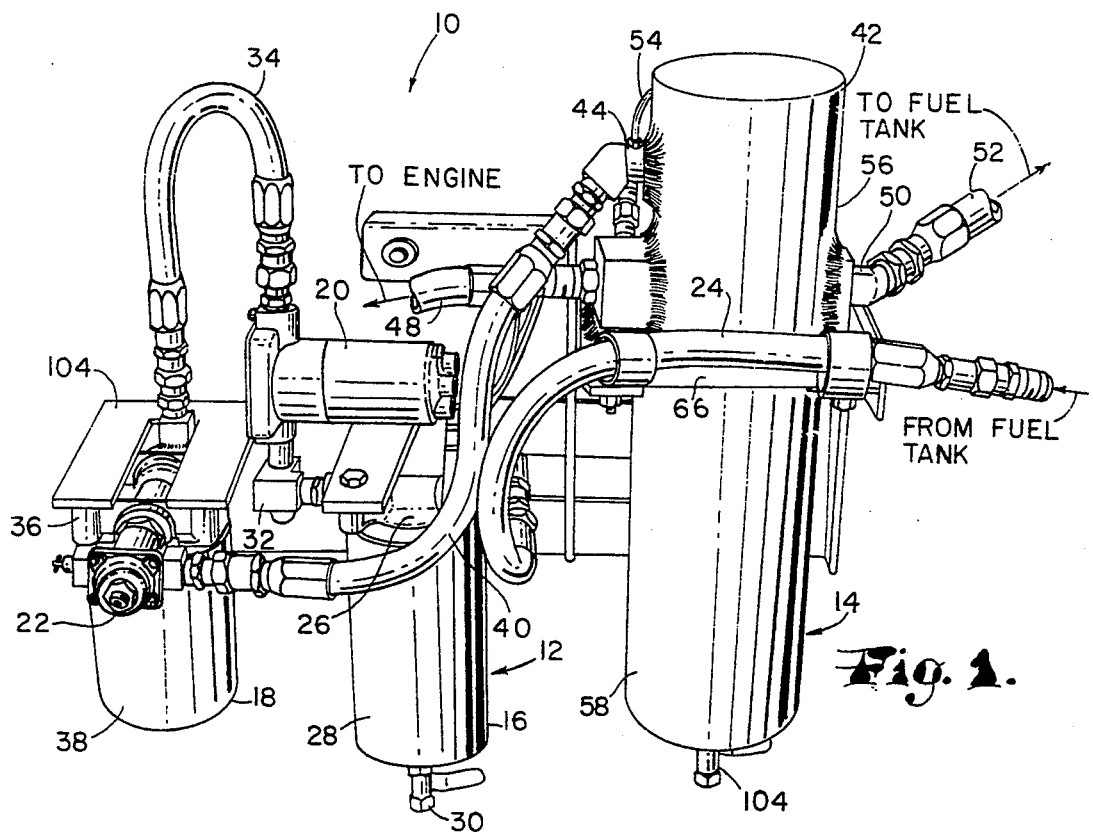
FIG. 1 is a top front perspective view of the fuel delivery system for internal combustion engines in accordance with the present invention, showing the water separation filter, the particulate filter, the air filter, the fuel pump, and the regulator.

Referring now to the drawings, a fuel delivery system 10 in accordance with the present invention includes initial fuel filter means 12 and a secondary fuel filter 14 for removing an undesired gas such as air bubbles entrained within the fuel moving therethrough. As described further herein, the system 10 is described as used with a diesel engine as is used in semi-trailer tractors, but it is to be understood that the invention is equally applicable to all internal combustion engines whose performance may be enhanced by the provision of fuel free from air or other unwanted gasses. The initial fuel filter means may include a water separation filter 16 and a particle filter 18, as well as a fuel pump 20 and a regulator valve 22.

Figure 2:
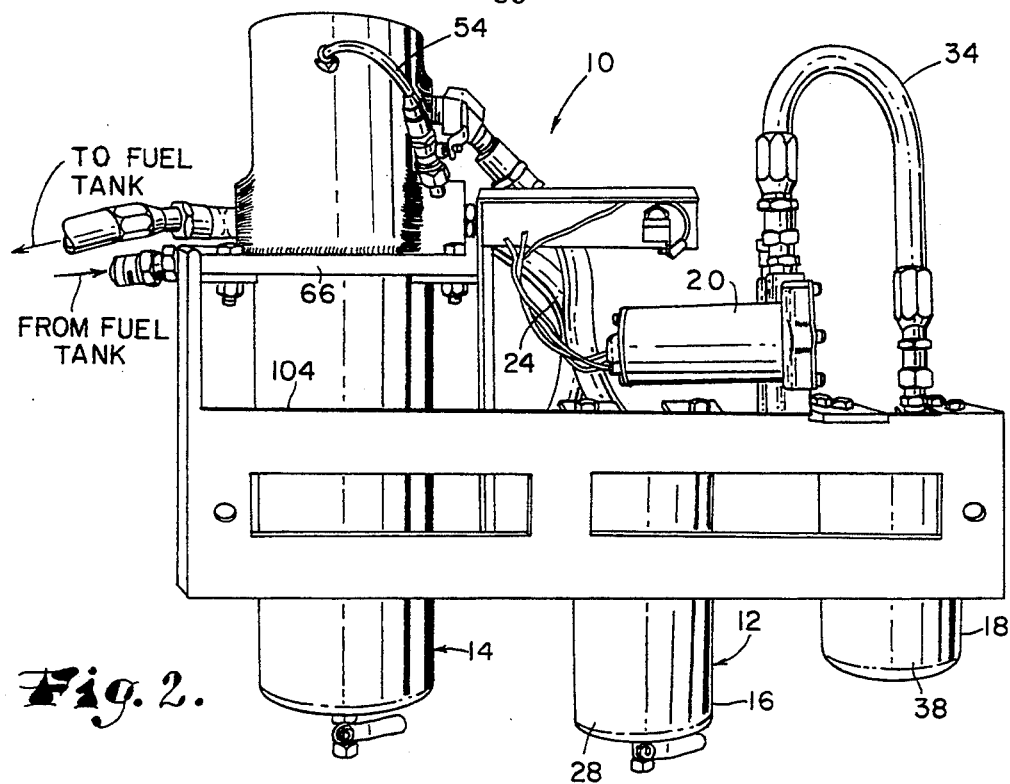
FIG. 2 is a top rear perspective view of the fuel delivery system shown in FIG. 1.

In greater detail, FIGS. 1 and 2 illustrate the preferred embodiment of the invention for use with a diesel engine, wherein a braided steel intake conduit 24 connects the water separation filter 16 with a source of fuel, e.g. a fuel tank. Intake conduit 24 thus leads to the water separation filter 16 where water in liquid form is removed from the fuel as is conventional in diesel engine applications and well known to those skilled in the art. The water separation filter 16 as shown herein includes a filterhead 26 and a removable cartridge 28 provided with a drain valve 30 for removing collected water therewithin. The cartridge as shown has been fabricated using a screen within a cartridge, but such water separators are well known in the art and an exemplary model satisfactory for use in the present system is available as model number FS 1212 from Fleetguard of Nashville, Tenn. Filterhead 26 is available as Fleetguard as part number 142784.

Fuel is then conveyed via transfer fitting 32 to fuel pump 20, which is a standard electric fuel pump sold as a unit with the regulator valve 22 as part number 12802 manufactured by Holley company of Goodletsville, Tenn. It is to be understood that the various fittings and fuel lines are provided with suitable threaded collars and the like to permit fluid-tight connections as is conventional and well known in the art. Fuel is thus pressurized by the pump 20 and transferred to the particle filter 18 by braided steel pump discharge line 34. Particle filter 18 includes a filterhead 36 available from Fleetguard as part number 142784 and a filter element 38 threadably mounted thereon. One such filter element is sold under the part number FF211 and is available from Fleetguard of Nashville, Tenn. The particle filter 18 serves to remove unwanted solids carried with the fuel. Such solids could be rust particles from the fuel tank, or any other solid debris carried with the fuel.

From the particle filter 18, fuel passes through regulator 22 for controlling the flow rate at which the fuel is deliver, ed. In the present embodiment for use with a six cylinder Cummins "NTC" series engine, the regulator would be set to 35 gph for fuel passing from the regulator 22 through braided steel inlet line 40.

Figure 3:
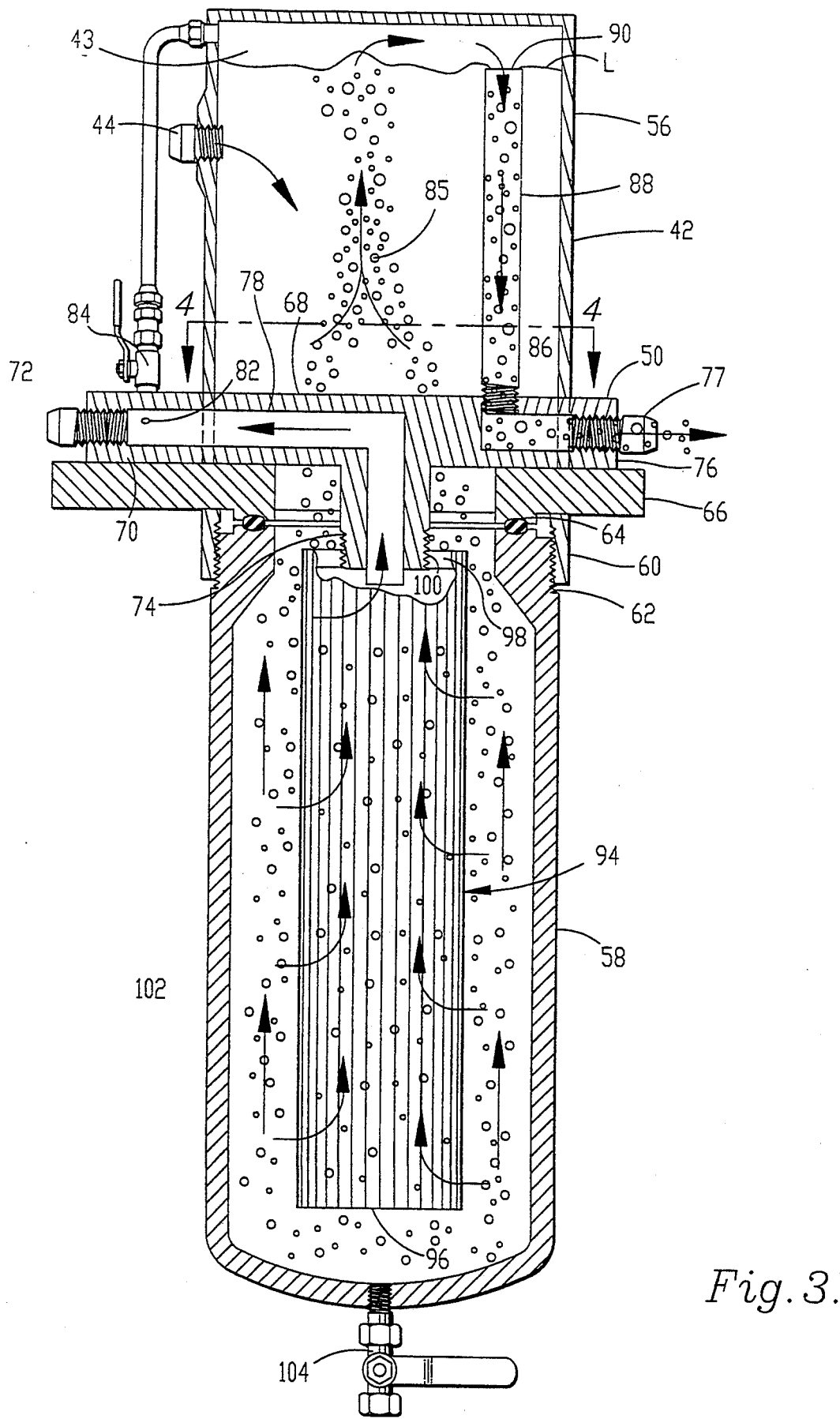
FIG. 3 is an enlarged, vertical cross-sectional view of the air filter showing the path of the fuel and the separation of the bubbles of air therefrom.
Figure 5:
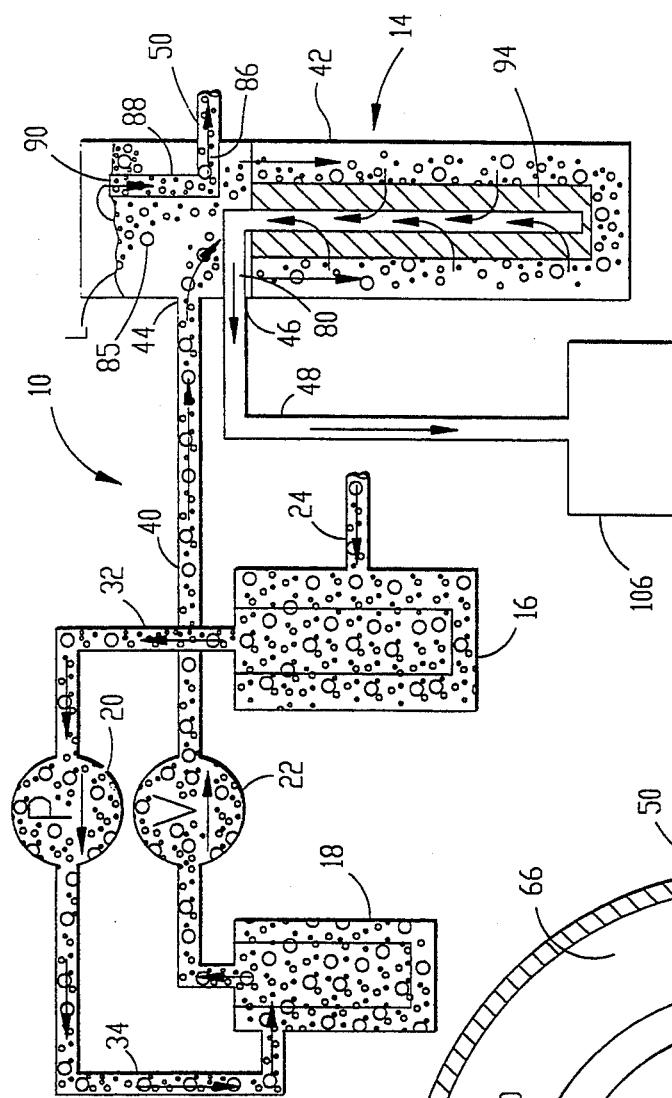
FIG. 5 is a schematic view representing the flow of fuel and air through the fuel delivery system hereof.
Figure 4:
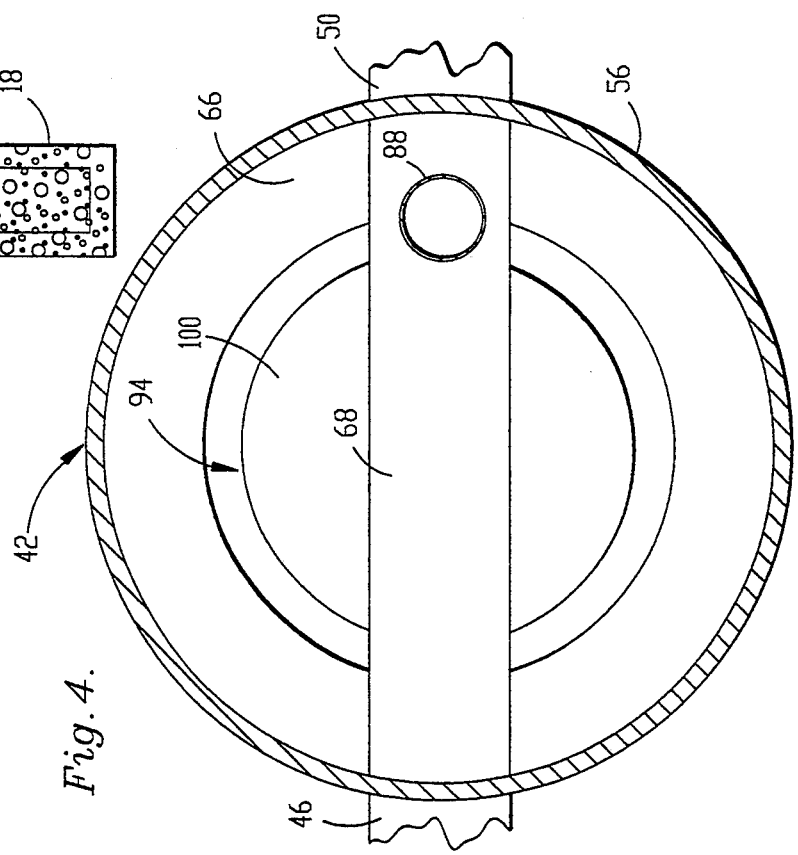
FIG. 4 is an enlarged, horizontal cross-sectional view of the air filter taken along line 4—4 of FIG. 3.

Secondary fuel filter 18 for removing air;from the fuel is shown in greater detail in FIGS. 3 and 4 and includes a vessel 42 defining an interior 43, an inlet 44 fluidically connected to inlet line 40, an outlet 46 fluidically connected to a fuel outlet line 48 leading to the fuel injection system and engine, and a fuel return discharge 50 which is connected to fuel return line 52 leading to the fuel tank supplying fuel to the engine. The secondary fuel filter also includes an air purge line 54 connecting the outlet 46 and the uppermost portion of the vessel 42 to allow air to bleed out of the outlet 46 and the fuel outlet line 48 during initial filling of the vessel with fuel.

Vessel 42 includes an uppermost housing portion 56 and a lowermost canister portion 58 threadably connected thereto. The housing 56 presents a lower circumscribing lip 60 which is internally threaded and complimentarily configured with an upper rim 62 of canister 58 which is externally threaded. An O-ring seal 64 is provided between mounting bracket 66, which is welded around its circumference to housing 56, and canister 58.

Outlet 46 and fuel return discharge 50 are formed of a single block 68 of aluminum, steel, brass or other metal which can be readily worked. Block 68 includes an outlet leg 70 threadably receiving outlet fitting 72 thereon, a substantially centrally located filter media receiver 74, and a fuel return leg 76 which is threaded to receive return fitting 78 thereon. Block 68 defines an L-shaped passageway therein extending from downwardly extending externally threaded filter receiver 74 through outlet leg 70. Adjacent the portion of outlet leg 70 receiving fitting, an aperture 82 is provided through the block 68 for fluidically connecting the passageway 80 and the fuel outlet line 48 to the air purge line 54. The air purge line 54 includes a valve 84 which is normally closed during operation but may be opened during filling of the vessel and fuel outlet line 48 to permit air which would otherwise be trapped therein to flow back to the upper portion of the housing. The air purge line 54 is preferably connected to the housing 56 at a point above the normal fuel level L within the vessel so that air flowing through the air purge line 54 may avoid the creation of any unnecessary air bubbles 85.

Fuel return leg 76 in block 68 is also, provided with an L-shaped bore 86 receiving thereon overflow tube 88. The upper margin 90 of overflow tube 92 defines the fuel level L, and serves to provide somewhat of a fluid head to aid in ensuring positive fuel flow through the passageway 80 to the fuel outlet line.

The filter receiver 74 is externally threaded as noted above and receives thereon replaceable filter cartridge 94 for filtering air from fuel, cartridge 94 being preferably an elongated tubular, cylindrical shaped member having an enclosed bottom 96, a top 98 which is impermeable and provided with a threaded opening 100, and a circumscribing filter media 102 which is preferably permeable paper having openings no greater than 25 microns and most preferably 20 microns or less. The filter media 102 is submerged below the fuel level L as determined by the upper margin 90 of the overflow tube 88 to provide the following advantages: (1) a sufficient supply of fuel is provided on demand to the engine; (2) air bubbles retained on the filter media 102 are allowed to float up and away from the filter media; (3) a sufficient amount of liquid is provided above the filter media 102 so that many bubbles float up to fuel level L and out of overflow tube 92 before coming in contact with the filter media 102; and (4) only fuel and not free (non-bubble) air comes in contact with the filter media to prevent air from moving downstream through the outlet. A drain tap 104 is provided at the bottom of the canister 58 for ease in draining the vessel 42 during change-out of the air filter cartridge 94.

The essential components of the fuel delivery system 10 hereof are mounted on a bracket 104, and while the specific arrangement of the components is not critical, it is important that the outlet 46 be somewhat elevated relative to the fuel injector delivery system so that outlet line 48 inclines downwardly from the outlet 46. This enables the fuel in the vessel 42, and particularly that in the housing 56, to maintain a fluidic head to ensure constant delivery of fuel to the fuel injectors and engine 106, and also allows any air in the outlet line 48 to bleed out through air purge line 54 during filling. Thus, prior to normal operation of the engine, fuel is pumped by the fuel pump 20 until the vessel 42 is filled to the fuel line L. During filling, the valve 84 is open to permit the purged air to return to the fuel tank through the overflow tube 88 until fuel begins to flow back to the tank through return line 52, which indicates that the system 10 is fully charged for operation.

In some circumstances, it may be desirable to cycle fuel through the system 10 prior to engine operation so that the fuel may be prefiltered. The fuel delivery system 10 permits the user to have that option which may be especially desired when fuel has been sitting unused for an extended period. It may then be desirable to filter microbes which develop under those circumstances by prefiltering the fuel and, if necessary, changing the filter element(s) before use.

In operation, the present system ensures a positive delivery of fuel to the fuel injection pump which is substantially free of unwanted gasses such as air. It should be recognized that the pump 20 ensures a positive fuel flow through the both primary and secondary filters, and that the possibility of fuel starvation to the engine is accordingly lessened by the provision of pump 20. In addition, diesel and other distillate fuels are especially susceptible to retaining air bubbles. Thus even though the fuel may settle in a fuel tank and then pass through water separation filter 16 and the particle filter 18, significant quantities of air bubbles remain entrained in the fuel.

Fuel thus enters air separation filter 18i from the inlet line 40 and through inlet 46 into the vessel 42. The inlet 46 is preferably below fuel level L. The fuel is drawn downwardly and the circulation within the vessel 42 may cause some of the bubbles 85 to float free to level L. Some of the bubbles 85 are carried downwardly toward filter cartridge 94. The filter media 102 of the cartridge, having only very small openings of 25 microns or less, and most preferably 20 microns or less, allows the liquid fuel to pass through but the air bubbles are trapped on the filter media 102 and cannot pass through the filter media to enter the, interior of the filter cartridge 94. The bubbles 85 dislodge from the filter media and float to the surface either through agitation or as the size of the bubbles 85 increase due to aggregation when the buoyancy of the air is greater than the adhesion between the surface of the bubble 85 and the filter media.

As the bubbles float to the surface or level L, they spill over margin 90 and are carried with the excess fuel to move downwardly through the upright overflow tube 88. The pump 20 and regulator 22 permit sufficient flow of fuel into the vessel 42 so that even during full throttle application of the engine, there will be excess fuel flowing back to the tank through the return line 52. This ensures both an absence of fuel starvation as well as a continuous removal of unwanted air from the fuel being delivered to the engine.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the liberal scope of the invention as set out in the following claims.

I claim:

1. A fuel delivery system for removing undesired components from fuel delivered from a fuel tank to an engine comprising, in combination:
   an engine;
   initial fuel filter means for removing water from fuel received from the fuel tank; and
   secondary fuel filter means including an outlet in fluidic communication with said engine and an inlet in fluidic communication with said initial fuel filter means and located downstream therefrom for receiving fuel containing an undesired gas from said initial fuel filter means and separating substantially all of said undesired gas from fuel received therein prior to passage of said fuel through the outlet,
   said secondary fuel filter means including a vessel defining a hollow interior chamber in fluidic communication with a return line in fluidic communication with said fuel tank for returning fuel and undesired gas thereto, and a filter media positioned within said chamber for immersion in fuel received therein and a conduit located within said filter media for delivering fuel passing through said filter media to said outlet.

2. A fuel delivery system as set forth in claim 1, wherein said filter media is a paper filter presenting substantially no openings therethrough having a greater dimension than 25 microns.

3. A fuel delivery system as set forth in claim 2, wherein said vessel includes a housing section and canister section removably mounted thereto, and wherein said filter media is included in an elongated removable cartridge positioned within said canister section.

4. A fuel delivery system as set forth in claim 3, wherein said housing includes structure for threadably mounting said filter cartridge thereto.

5. A fuel delivery system as set forth in claim 1, wherein said vessel includes a selectively actuatable drain valve.

6. A fuel delivery system for removing undesired components from fuel delivered from a fuel tank to an engine comprising, in combination:
   an engine
   initial fuel filter means for removing water from fuel received from the fuel tank; and
   secondary fuel filter means including an outlet in fluidic communication with said engine and an inlet in fluidic communication with said initial fuel filter means and located downstream therefrom for receiving fuel containing an undesired gas from said initial fuel filter means and separating substantially all of said undesired gas from fuel received therein prior to passage of said fuel through the outlet,
   said secondary fuel filter including an air purge line operatively connecting a normally uppermost portion of said vessel and said outlet, said air purge line having a purge valve connected thereto for permitting the flow of air from said outlet to said upper portion of said vessel.

7. A fuel delivery system as set forth in claim 1, wherein said initial fuel filter means includes a first water separation filter and a second particulate filter positioned upstream from said secondary filter.

8. A filter for removing air from fuel received from a fuel tank prior to delivery to an engine comprising:
   a substantially enclosed vessel including a fuel inlet, a fuel outlet leading to the engine, and a fuel return line leading to said storage tank, said vessel including a normally upright tube presenting a substantially open upper margin defining an operating fuel level within said vessel, said vessel further including means in direct fluidic communication with said outlet for detachably mounting a cartridge thereon; and a air removal filter cartridge detachably received within said vessel, said cartridge being positioned below said operating fuel level for allowing air bubbles separated by said cartridge to float upwardly to said fuel level and be discharged through said fuel return line.

9. A filter as set forth in claim 8, said vessel including a normally uppermost housing portion and a normally lowermost canister portions threadably mounted thereto.

10. A filter as set forth in claim 8, including structure on said vessel threadably mounting said cartridge.

11. A filter as set forth in claim 8, said fuel outlet including an aperture, and including a purge line extending between said outlet and said vessel and fluidically connecting said outlet and said vessel for purging air from said fuel outlet to return to the fuel tank through the fuel return line.

12. A filter as set forth in claim 11, including valve means associated with said purge line for selectively closing said purge line to prevent the passage of air therethrough.

13. A filter as set forth in claim 8, wherein said inlet and said outlet are located below said operating fuel level.

14. A filter for removing entrained and entrapped air from fuel received from a fuel tank prior to delivery to an engine comprising:

a substantially enclosed vessel including a normally upright tube presenting a substantially open upper margin defining an operating fuel level within said vessel, said vessel further including means in direct fluidic communication with said outlet for detachably mounting a cartridge thereon; and a air removal filter cartridge detachably received within said vessel and including a filter element having substantially no openings therethrough having a dimension greater than about 25 microns for substantially complete separation of air from the fuel, said cartridge being positioned below said operating fuel level for allowing air bubbles separated by said cartridge to float upwardly to said fuel level and be discharged through said fuel return line.

15. A fuel delivery system for removing undesired components from fuel delivered from a fuel tank to an engine comprising, in combination:

an engine;

initial fuel filter means for removing water from fuel received from the fuel tank; and secondary fuel filter means including vessel walls defining an interior chamber having an outlet in fluidic communication with said engine, an inlet in fluidic communication with said initial fuel filter means for receiving fuel containing an undesired gas from said initial fuel filter means, and a return line opening;

a filter element dividing said chamber into an inlet side and an outlet side, and providing means for preventing substantially all undesired gas in said fuel from passing through said outlet, said preventing means including said filter element separating said inlet side from said outlet side and having substantially no openings having a greater dimension than about 25 microns passing from said inlet side to said outlet side, said return line opening communicating with said chamber on said inlet side to receive air and fuel therefrom; and a fuel return line communicating said return line opening and said fuel tank for delivery of air and fuel to said fuel tank.

16. A fuel delivery system for removing undesired components from fuel delivered from a fuel tank to an engine comprising, in combination:

an engine initial fuel filter means for removing water from fuel received from the fuel tank; and secondary fuel filter means including an outlet in fluidic communication with said engine and an inlet in fluidic communication with said initial fuel filter means and located downstream therefrom for receiving fuel containing an undesired gas from said initial fuel filter means and separating substantially all of said undesired gas from fuel received therein prior to passage of said fuel through the outlet, said secondary fuel filter including an air purge line operatively connecting a normally uppermost portion of said vessel and said outlet, said air purge line having a purge valve connected thereto for permitting the flow of air from said outlet to said upper portion of said vessel.

* * * * *